United States Patent
Luijten et al.

[11] Patent Number: 6,023,466
[45] Date of Patent: Feb. 8, 2000

[54] BIT MAPPING APPARATUS AND METHOD

[75] Inventors: Ronald P. Luijten, Thalwil; Hans R. Schindler, Langnau, both of Switzerland

[73] Assignee: International Business Machines Corporation, Armonk, N.Y.

[21] Appl. No.: 08/702,595

[22] PCT Filed: Feb. 25, 1994

[86] PCT No.: PCT/EP94/00538

§ 371 Date: Aug. 23, 1996

§ 102(e) Date: Aug. 23, 1996

[87] PCT Pub. No.: WO95/23380

PCT Pub. Date: Aug. 31, 1995

[51] Int. Cl.[7] ............................ H04L 12/56; H03M 7/12; H03M 7/20
[52] U.S. Cl. .......................... 370/395; 341/62; 341/102; 711/202
[58] Field of Search ...................................... 370/389, 401, 370/402, 395, 392, 381, 382; 709/243, 245, 252; 711/202, 169, 200; 341/102, 103, 67, 62

[56] References Cited

U.S. PATENT DOCUMENTS

| | | | |
|---|---|---|---|
| 5,261,090 | 11/1993 | Lien | 395/600 |
| 5,271,010 | 12/1993 | Miyake et al. | 370/392 |
| 5,696,925 | 12/1997 | Koh | 711/202 |
| 5,696,930 | 12/1997 | Garetz et al. | 711/202 |
| 5,699,539 | 12/1997 | Garber et al. | 711/202 |
| 5,737,564 | 4/1998 | Shah | 711/202 |
| 5,895,500 | 4/1999 | Thompson et al. | 711/202 |

FOREIGN PATENT DOCUMENTS 9523380  8/1995  WIPO ............................ G06F 17/30

OTHER PUBLICATIONS

IBM Technical Disclosure Bulletin, vol. 35, No. 5, Oct. 1992, New York US pp. 396–397 "Use of an Associative Memory Scheme for Large RAM/ROM Simulation Models".

Primary Examiner—Alpus H. Hsu
Assistant Examiner—Afsar M. Qureshi
Attorney, Agent, or Firm—Joscelyn G. Cockburn

[57] ABSTRACT

A fast n-bit to k-bit mapping or translation method and apparatus avoiding the use of content addressable memories (CAMs) is described. It essentially is characterized by using two conventional storage (RAMs). In the first storage (3), the n-bit words are stored preferably in an order determined by the binary search key. The second storage (4) holds the corresponding k-bit translations. Both storages are addressed by essentially the same address, which is established during the (binary) search performed to find a match between an input n-bit word and the contents of the first storage. In variants of the invention, the use of parallel comparisons and of pipelining is demonstrated.

16 Claims, 4 Drawing Sheets

BIT MAPPING APPARATUS AND METHOD

Given a mapping from a subset of n-bit wide words, which may be keywords, addresses, identifiers, etc., to a set of k-bit wide words (k<n), the invention relates to a method and apparatus for rapidly looking up the k-bit word corresponding to a given n-bit word. More specifically, it relates to the building, use, and maintenance of an n-bit to k-bit translating or mapping device, in particular for use in an application involving the rapid transfer of digital data, such as high speed parallel processing or telecommunications. More specifically, it concerns an n-to-k-bit mapping apparatus and method using a random access memory in which digital data are stored in an order specified by a search key.

BACKGROUND OF THE INVENTION

In computing and telecommunications, often a situation is encountered in which from the $2^n$ possible words with n bits, representing for example instructions, memory locations, node or hosts addresses, only a significantly smaller subset is actually supported or used at a particular place or time. For the purpose of describing the current invention, this smaller number of words is denoted by $2^k$, with k being an integer smaller than n. In order to avoid unnecessary expenditures and unused resources, this situation can be solved by a translation of the n-bit words into k-bit words to be used in a local or temporary application. In terms relevant to the related technical field, this translation is known as 'lookup' or 'mapping' function. A description of the header conversion within a ATM-type switching system, as given below, may serve as an example for this general concept.

The ATM switching technique is currently under development by all major telecommunications equipment manufacturers. ATM is an acronym made up from asynchronous transfer mode. This switching technology allows the exchange of digital data coming from customer premises, e.g. connections from homes or offices, from local area networks (LANs), or from other switches, routers, or gateways. Data transmitted in ATM are divided into standard-size packets, called cells. Each cell has to be provided with a header containing information concerning addressee and receiving node or user. According to currently valid standards, the bit string identifying the receiver of an ATM cell is 28 bits wide and divided into a virtual path identifier field (VPI) and a virtual channel identifier field (VCI). Out of these $2^{28}$ possible addresses, a state-of-the-art ATM switch may support approximately 10,000 at a time, which lets k assume a value of 13 or 14. Thus, the switch allows the conversion of $2^k$ incoming VPI/VCIs into new VPI/VCIs to enable, for example, the next 'hop' of the respective data packets towards their final destination address.

This header conversion is performed by means of a lookup table, in which the incoming VPI/VCI is identified and translated into the VPI/VCI which is paired to it. Comparing the number of supported VPI/VCI values ($2^k$) with the number of possible VPI/VCIs ($2^n$, n=28). it is immediately obvious that a simple lookup table which pairs n-bit words is ineffective as the overwhelming number of entries has no counterpart.

This problem is solved by an (intermediate) translation of those n-bit addresses supported by the switch into k-bit words and performing the (final) conversion back to an n-bit word in a second lookup step in a table which has only $2^k$ entries. As this second lockup step can easily be implemented, the prior art is focused on the problem of mapping or translating the supported n-bit words into k-bit words.

For the n-to-k-bit translation, typically content addressable memories (CAMs) are used. An example for this technique is given in European patent application EP-A-0 500 238, in which the n-bit VPI/VCI is extracted from the header of an incoming ATM cell and fed into a CAM. The k-bit output word of the CAM is used to address a conventional random access memory (RAM), which holds the new VPI/VCI to be attached to the outgoing ATM cell. A similar approach is proposed for a high performance Internet router in IBM's Technical Disclosure Bulletin, Vol.36, No.02, February 1993, pp. 151–153. The Internet protocol (IP) network described therein employs 32-bit addresses for its nodes, but the underlying problem remains the same.

Though being in principle easy to implement, a widespread use of CAMs has been prevented by their cost. CAMs have to be specially designed for the simultaneous n-bit wide comparison operation. resulting in a significantly higher number of transistors per bit compared to random access memories. By this reason, several attempts to replace the expensive CAM by less costly RAMs were motivated.

As the present invention can broadly be conceived as a new way of replacing CAMs by RAMs, a short summary of previous proposals for such a replacement will be given in the following.

In the European patent application EP-A-0 459 703, a content addressable memory is described, comprising a RAM array and a counter. Using a decoder, this counter cycles through all entries of the memory array. The outputs of the memory are successively compared to an input signal value. The comparator issues a signal indicating whether or not a match has occurred. When a match is found between the input signal value and the value currently selected from the RAM, the appropriate counter value is applied to a stack buffer. The stack buffer is used to store the value of the counter corresponding to the entry of the RAM for which a match has been found. According to the description, the stack can be organized as a queue, or it may be a single register for storing a single value. No method for translating the input value is described. Further, EP-A-0 459 703 gives no indication concerning a particular arrangement of the entries stored in the RAMA.

A hybrid CAM/RAM circuit is known from EP-A-0 228 917. The signal bus carrying the compared (information to be compared) is split into a first portion, which is applied to a CAM section, and into a second portion which is stored in a comparator. In case of a favorable comparison, the CAM section produces a match signal and a pointer to an entry in the RAM section. This entry is compared to the second portion of the compared (information to be compared) The entries in the RAM section are stored in accordance with the pointers developed by the CAM section. No specific order of entries is mentioned.

A memory structure allowing the maintenance of records in a sorted list according to a search key is described in the international application WO 90/04849 published under PCT. One particular use of the memory structure is as the core of a content addressable memory. Essentially, fast insert and delete operations are described, keeping the defined order of the records in plurality of contiguous memory locations. The sorted list of entrees may be searched by any appropriate search algorithm. As an example for a search algorithm, the binary search is mentioned.

In view of the above mentioned prior art, it is an object of the invention to provide a fast n-bit to k-bit translating or mapping device avoiding the use of any content addressable memories. No constraints should be imposed on the choice of the k-bit words to provide for a wide range of applications. A particular object of the invention is to enable a fast n-bit to k-bit translation for data switches with data throughput above 100 Mbps, especially for an VCI/VPI translation.

SUMMARY OF THE INVENTION

The basic features of the invention include two random access memories (RAMs), which will be referred to in this description as SEARCH RAM and LOOKUP RAM, respectively. Entries to the SEARCH RAM are n bit wide, whereas the data stored in the LOOKUP RAM represent the k-bit translations of those entries. Any incoming n-bit word is compared to the entries in the SEARCH RAM and, if a match is found, the corresponding k-bit translation is read from the LOOKUP RAM.

For this purpose, both, the n-bit entry in the SEARCH RAM as well as its respective k-bit translation in the LOOKUP RAM, are directly addressable by the same address. The term 'directly addressable' is meant to include any fixed relation between the addresses to both RAMs: by finding the address to an n-bit word stored in the SEARCH RAM, the address to the corresponding k-bit translation is either given immediately or can be calculated in a fast, straightforward manner. Though the simple use of the address to a matching entry of the SEARCH RAM as a k-bit translation of that entry may be the fastest translation method, the current invention does not promulgate this method for the sake of a greater flexibility. By using the established address to the matching n-bit entry in the SEARCH RAM just as an intermediate pointer to the actual k-bit translation, as stored in the LOOKUP RAM, this k-bit translation can be chosen free from any constraints possibly imposed by the searching process.

The preferred searching process itself is known as binary search, though any other search process may be feasible for a small number of entries. The binary search is an established method for rapidly searching an ordered, dense table (i.e. every cell of the table contains an entry) for a particular entry by successively looking at the one half of the table in which the entry is known to be.

Within the scope of the current invention, the entries to the SEARCH RAM are ordered in compliance with the requirements of the binary search: in a basic embodiment of the invention, the entries to the SEARCH RAM are stored in an ascending (or descending) order. This order is changed in other embodiments of the invention to fit for a parallel comparison or to enable a look-ahead and pipelined variant as will be explained below. The search operation is controlled by a SEARCH ENGINE or MACHINE. It should be noted that the terms 'machine' or 'engine' are commonly used in the art to describe a device which may either be software executing on a host or a dedicated microprocessor or custom built hardware. For high speed switching technology, however, only an implementation in terms of a finite state machine in hardware is feasible.

The SEARCH ENGINE determines the address to the entry in the SEARCH RAM that matches the input n-bit word and to the respective k-bit translation stored in the LOOKUP RAM. For this purposes, it uses a binary search mechanism. The contents of an address register is altered in accordance with the results of the comparison operation. The new address points to the middle of the table of searchable entries which remain after the previous search step.

In a basic variant of the invention, the entry at the middle of the SEARCH RAM is compared to the input value. Depending on the result of this comparison (and of whether the table of entries is stored in an ascending or descending order), the middle of the upper or lower half of the SEARCH RAM address space is addressed. This process rapidly converges to the searched value or, else, indicates that no matching entry is stored in the SEARCH RAM.

In further embodiment of the invention. a number i of comparisons are made in parallel, significantly accelerating the binary search. This embodiment requires the use of either one i×n bit wide SEARCH RAM or of an appropriate number of SEARCH RAMs with a smaller data width. Additionally, the search engine has means to distinguish the results of the parallel comparators and to modify the address accordingly.

In a further embodiment of the invention, a pipelining and look-ahead mechanism is applied: the step of addressing the SEARCH RAM is separated from the step of comparing the addressed entries, and both steps are performed within the same instruction cycle. The performance speed of this embodiments is no longer dominated by the time to perform both step but rather by the slower one.

As stated above, two provisions have to be taken care of: first, the entries to the SEARCH RAM have to be kept in the order dictated by the binary search mechanism. Second, the entries to the LOOKUP RAM have to be kept directly addressable by the addresses to the corresponding entries of the SEARCH RAM. As a consequence, every update of the SEARCH RAM is accompanied by a corresponding update of the LOOKUP RAM.

The update itself, i.e. the insertion and deletion of entries to both RAMs, is done preferably in a 'rippling' mode to maintain the operability of the RAMs for the searching process. The update process is performed stepwise, taking advantage of the fact that the binary search will produce correct results even if neighboring entries are equal.

In the rippling mode, the update is performed stepwise. For inserting entries, the entry at the top of the table is copied to the next higher position; then the entry just below is copied to the original position of the top entry, etc., until the position for the new entry to be inserted is reached. It is then copied into the location at that address. For this process, preferably time intervals available between the search processes as described above are used.

For deleting entries, basically the inverse of the insertion process is applied: the entry to be deleted is overwritten by the entry at the next higher sort position, etc., until the whole table is rearranged. Again this process may be executed in time intervals available between search processes. Both, insertion and deletion can be easily performed by a programmable microprocessor or by hardware as the update frequency is usually several orders of magnitude smaller than the frequency of the search process.

If it is not possible to interleaf the 'rippling' process into the normal search process, two pairs of SEARCH and LOOKUP RAM, one of which is updated while the other is operating, may be applied. The toggling between both pairs of RAMs can easily be done by appropriately controlled multiplexing devices.

These and other novel features believed characteristic of the invention are set forth in the appended claims. The invention itself however, as well as a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

DETAILED DESCRIPTION OF THE PREFERRED EMBODIMENT

Figure 1:
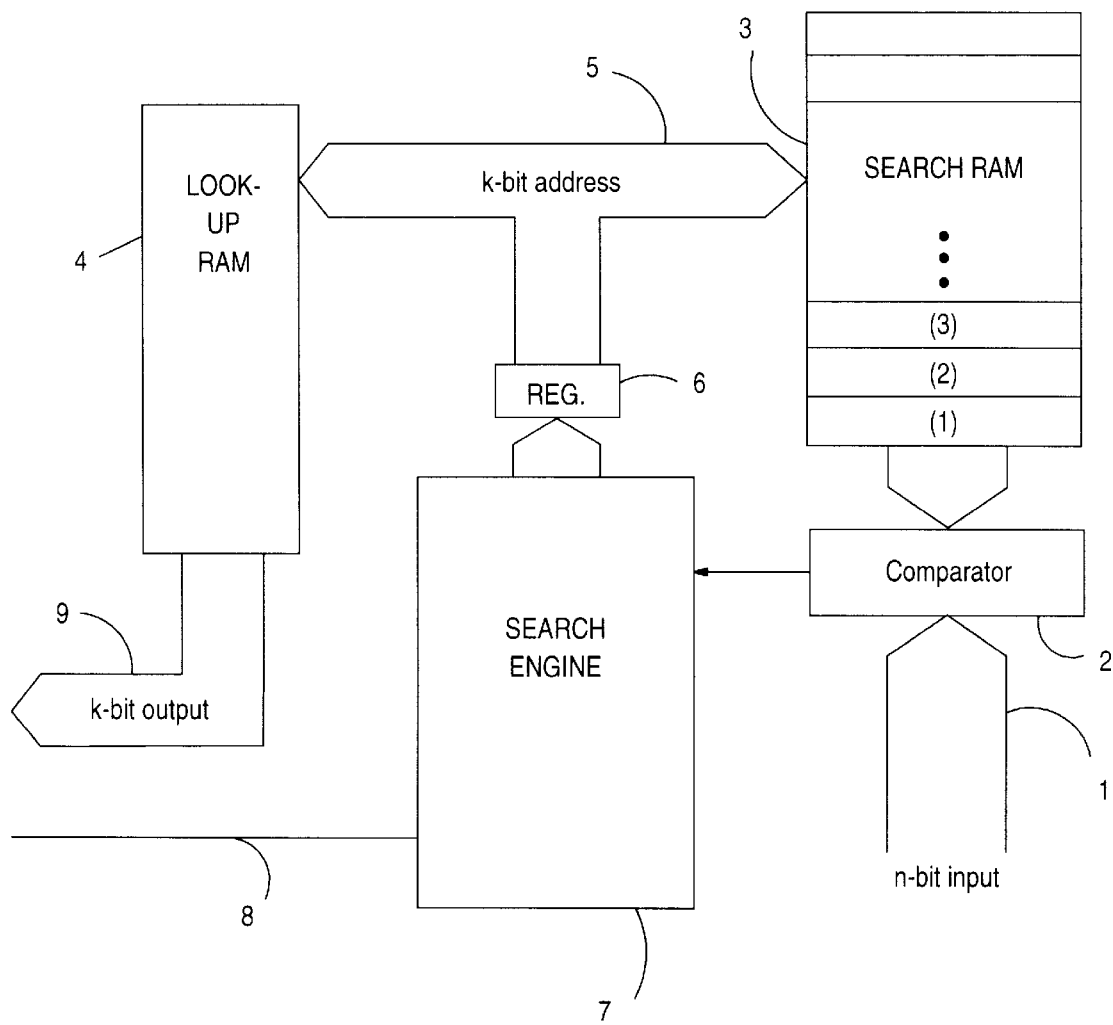
FIG. 1 is a block diagram showing basic components of the invention with one comparator.

The first example demonstrates the essential features of an VPI/VCI translation, as being performed in a ATM switch environment (not shown)From the header of an ATM cell, the 28-bit VPI/VCI digital data sequence is extracted and, referring now to FIG. 1, applied via the signal bus I to a 28-bit comparator 2. Referring further to FIG. 1, two random access memories are shown, the first of which, referred to as SEARCH RAM 3, is organized as a 16384-by-28-bit array. Its output data lines are connected to the 28-bit comparator 2. The SEARCH RAM 3 contains all VPI/VCI at one time supported by the switch.

The second random access memory 4. referred to as LOOKUP RAM, is organized as a 16384-by-14-bit array. Its 14-bit entries may represent pointers to other memory arrays containing, for example, new 28 bit VPI/VCIs to be attached to the ATM cell from which the input VPI/VCI has been extracted.

The address bus 5 of both RAMs 3, 4 are connected to a 14 bit register 6. The bits of this address register are set by a SEARCH ENGINE 7.

Before describing the operations of the SEARCH ENGINE, it should be noted that the entries or records stored in the SEARCH RAM 3 are ordered in a monotonous order. Monotonous is herein defined in its mathematical sense i.e. each entry is larger than or equal to its predecessor at the neighboring memory address. In essence, the SEARCH RAM contains an array in which the entries are ordered according to their numerical value. With the SEARCH RAM ordered in the described manner and with the entries of the LOOKUP RAM 4 stored at the same addresses as the respective entries at the SEARCH RAM, the SEARCH ENGINE 7 performs the operations described by the following cycles. Herein, the contents of the register 6 will be referred to as ADDR_REG and a binary representation of a number will be prefixed by the letter 'B'.

CYCLE 0 The entire value ADDR_REG in register 6 is set to zero, except for the most significant bit, which is set to B'1'. The value of ADDR_REG propagates to the SEARCH RAM 3 and the output of the SEARCH RAM is compared to the n-bit word supplied by line 1.

CYCLE 1 The new value of ADDR_REG is determined as follows:
If the outcome of the compare of cycle 0 was that the n-bit input word was less than the SEARCH RAM output, bit 0 (most significant bit) of ADDR_REG is RESET to B'0'. Independent of the comparison, bit 1 of the k bit wide register is set to B'1'.

CYCLE i (for 0<i<k−1)
If the n-bit input word is less than the SEARCH RAM output of cycle i−1, bit i−1 is reset to B'0' and always bit i of ADDR_REG is set to B'1'. Other bits of ADDR_REG remain unchanged.

CYCLE k−1 If the n-bit input word is less than the SEARCH RAM content lookup in cycle k−2, bit k−1 of ADDR_REG is reset to B'0'.

CYCLE k If the n-bit input word is equal to the SEARCH RAM content lookup in cycle k−1 then the output signal line 8 is set to B'1' (VALID), otherwise it is reset to B'0'.

The operation is complete with the output 9 of the LOOKUP RAM 4 representing the k-bit translation of the input n-bit word. The number of cycles needed to perform the n-to-k-bit lookup is k+1 at the most. If the n-bit word does not exist in the table stored in the SEARCH RAM 3, the signal line 8 will remain on zero.

Figure 2:
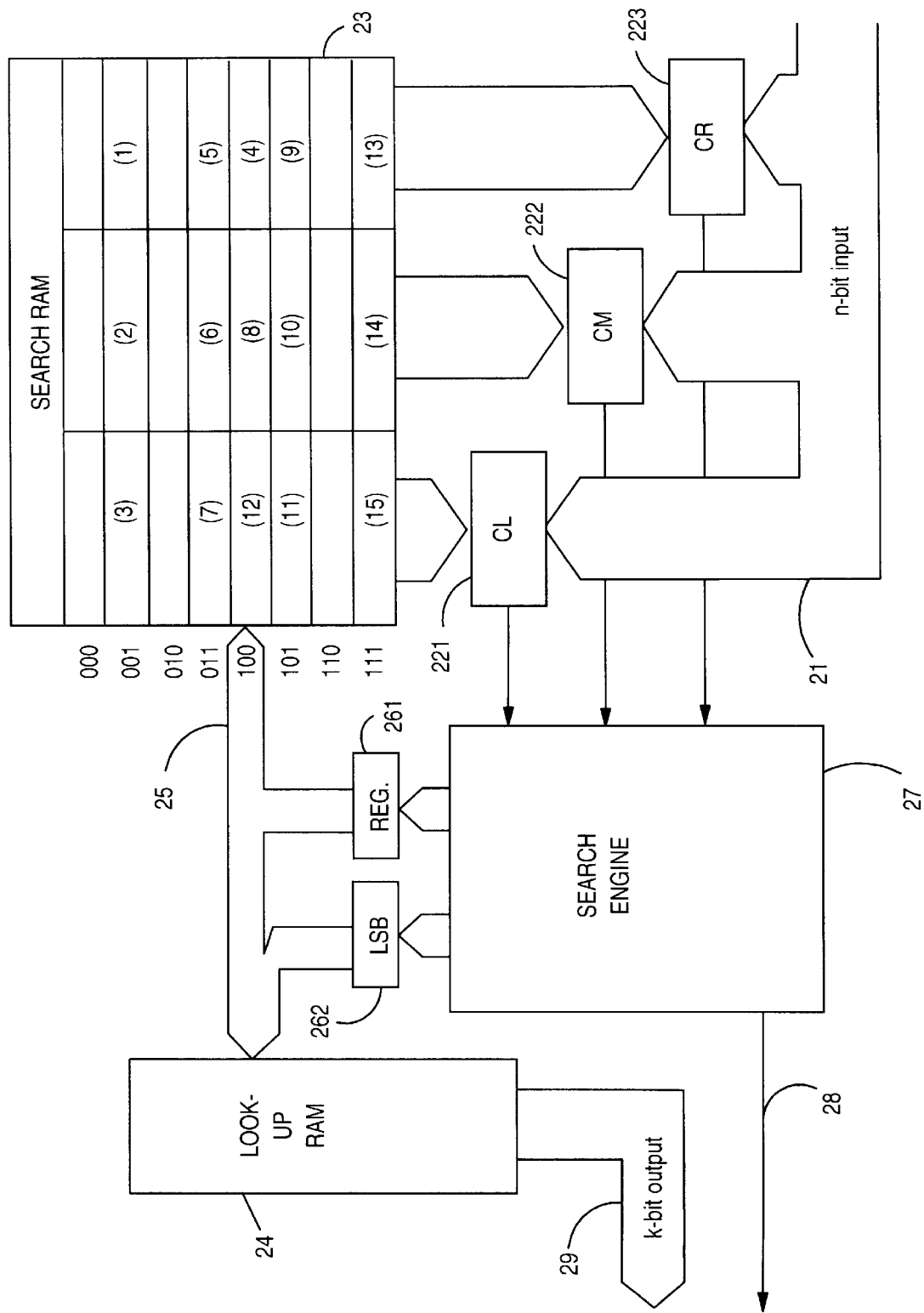
FIG. 2 shows the block diagram of an embodiment of the invention allowing parallel comparison.

Referring now to FIG. 2, an example of the invention operating with three comparators 221, 222, 223 in parallel is demonstrated. The SEARCH RAM 23 is organized as a matrix with 8 rows and 3 columns. The number of entries in this example is restricted to fifteen to facilitate the understanding of its basic principle. Those fifteen entries, each labeled with an ordinal number in brackets, are stored in the SEARCH RAM 23 in accordance with the scheme presented. Additionally, the binary addresses of the rows are given for a better orientation. The entries are ordered to allow a simultaneous comparison of not only the middle entry (8) of the complete table but also of the middle entries (12), (4) of the upper and lower half of the table when applying the first address through register 26 (which is B'100' in the present example). The other entries are ordered likewise for those addresses applied during subsequent search steps.

The search engine 27, besides setting the address register 261, now adds two bits from the least significant bit (LSB) register 262 according to the row in which the match occurred, to complete the k-bit address 25 applied to the LOOKUP RAM 24. As before, the SEARCH ENGINE 27 provides a 'valid' flag on signal line 28 to indicate that the output 29 of the LOOKUP RAM represents a valid translation.

In the following, the instructions performed by the SEARCH ENGINE 27 are given in detail CYCLE
0 set the initial ADDR_REG to B'100'. Set line 28 to zero.
CYCLE 1 The three outputs from the RAM are compared in parallel to the n-bit input word as follows:
Let iv=n-bit input word at bus 21 and the SEARCH RAM 23 content at (1) be C1 etc.
if (iv=C4) OR (iv=C8) OR (iv=C12) then jump to found
if (iv<C4) then set ADDR_REG to B'001'
if (iv<C8) AND (iv>C4) then set ADDR_REG to B'011'
if (iv<C12) AND (iv>C8) then set ADDR_REG to B'101'
if (iv>C12) then set ADDR_REG to B'111'
CYCLE 2 (assuming (iv>C12) in the cycle 1)
if (iv=C13) OR (iv=C14) OR (iv=C15) then jump to found
else jump to exit
found match=true;
The address for the LOOKUP RAM 24 (LUR_ADDR) is:
LUR_ADDR=ADDR_REG appended by
B'00' for a match in the right position,
B'01' for a match in the middle position,
B'10' for a match in the left position,
exit set signal line 28 to one to indicate a match, output LUR_ADDR;

In the following, the above instruction cycles for the SEARCH ENGINE are altered to cover an address register ADDR_REG with an arbitrary length of p bits, in which case the SEARCH RAM has $2^p$ entries in each of the three columns. The output of the right, middle, and left column of the SEARCH RAM is denoted by CR, CM, and CL, respectively. The bit positions of ADDR_REG are labeled with p–1, p–2, ..., 1.0. As before, binary numbers are mark by a prefix 'B'.

CYCLE 0 initialize the address register ADDR_REG(p–1, p–2, ... 1,0) to B'10000 ... 00'.

CYCLE 1 if (iv=CR) OR (iv=CM) OR (iv=CL) then jump to found
   if no match is found, the new value for the ADDR_REG is determined as follows:
     let q=p–2
     if (iv<CR) then ADDR_REG(q+1,q)=B'00'
     if (iv<CM) AND (iv>CR) then ADDR_REG(q+1,q)= B'01'
     if (iv<CL) AND (iv>CM) then ADDR_REG(q+1,q)= B'10'
     if (iv>CL) then ADDR_REG(q+1,q)=B'11'
     set ADDR_REG(q–1)=B'11'
     all other bits of ADDR_REG=(unchanged)

CYCLE i if (iv=CR) OR (iv=CM) OR (iv=CL) then jump to found
   if no match is found, the new value for the ADDR_REG is determined as follows:
     let q=p–2*i
     if (iv<CR) then ADDR_REG(q+1,q)=B'00'
     if (iv<CM) AND (iv>CR) then ADDR REG(q+1,q)= B'01'
     if (iv<CL) AND (iv>CM) then ADDR_REG(a+1,q)= B'10'
     if (iv>CL) then ADDR_REG(q+1,q)=B'11'
     set ADDR_REG(q–1)=B'1'
     all other bits of ADDR_REG =(unchanged)

CYCLE k For a SEARCH RAM being $2^p$ entries deep, the last cycle will have a cycle number (assuming p to be even): number of last cycle=p/2;
   if (iv=CR) OR (iv=CM) OR (iv=CL)
   then jump to found
   else jump to exit
found match=true, set the signal line 28 to one;
   The address for the LOOKUP RAM (LUR_ADDR) is
     LUR_ADDR=ADDR_REG appended by
     B'00' for a match in the right position,
     B'01' for a match in the middle position,
     B'10' for a match in the left position,
exit output LUR_ADDR.

The above concept can be extended to any desirable width. For a parallel/serial binary search the number of comparators used in parallel will be $2^m-1$, m being an integer, i.e. 1, 3, 7, 15 or 31 etc. The search instructions have been shown for m=1 and m=2. Any skilled person will easily derive those instructions for values of m higher than 2. The reduction in search time due to the parallel comparison can be calculated according to the following formula:

$$\text{search\_time}(m) = \text{next higher integer of}(\text{search\_time}(m=1)/m)$$

For m=2 (three thresholds) the search time is reduced by a factor of 2. The amount of RAM required increases by 50% for the triple comparison case as compared to the single comparison case.

In yet another example of the invention, the implementation of a pipelining and look-ahead mechanism is demonstrated. As in the previous example, a simplified table of fifteen entries is used. And the binary addresses to the rows of the SEARCH RAM 33 are given at each row, respectively (see FIG. 3).

To achieve a pipelining effect, the entry at the center of the table is stored in a separate register 331. This entry is immediately, i.e. in the first instruction cycle, subjected to a comparison at a comparator 320 (C0) with the input word. At each following cycle, the comparison with the addressed entries of the SEARCH RAM can be made while simultaneously applying the addresses for the next comparison to the SEARCH RAM.

Figure 3:
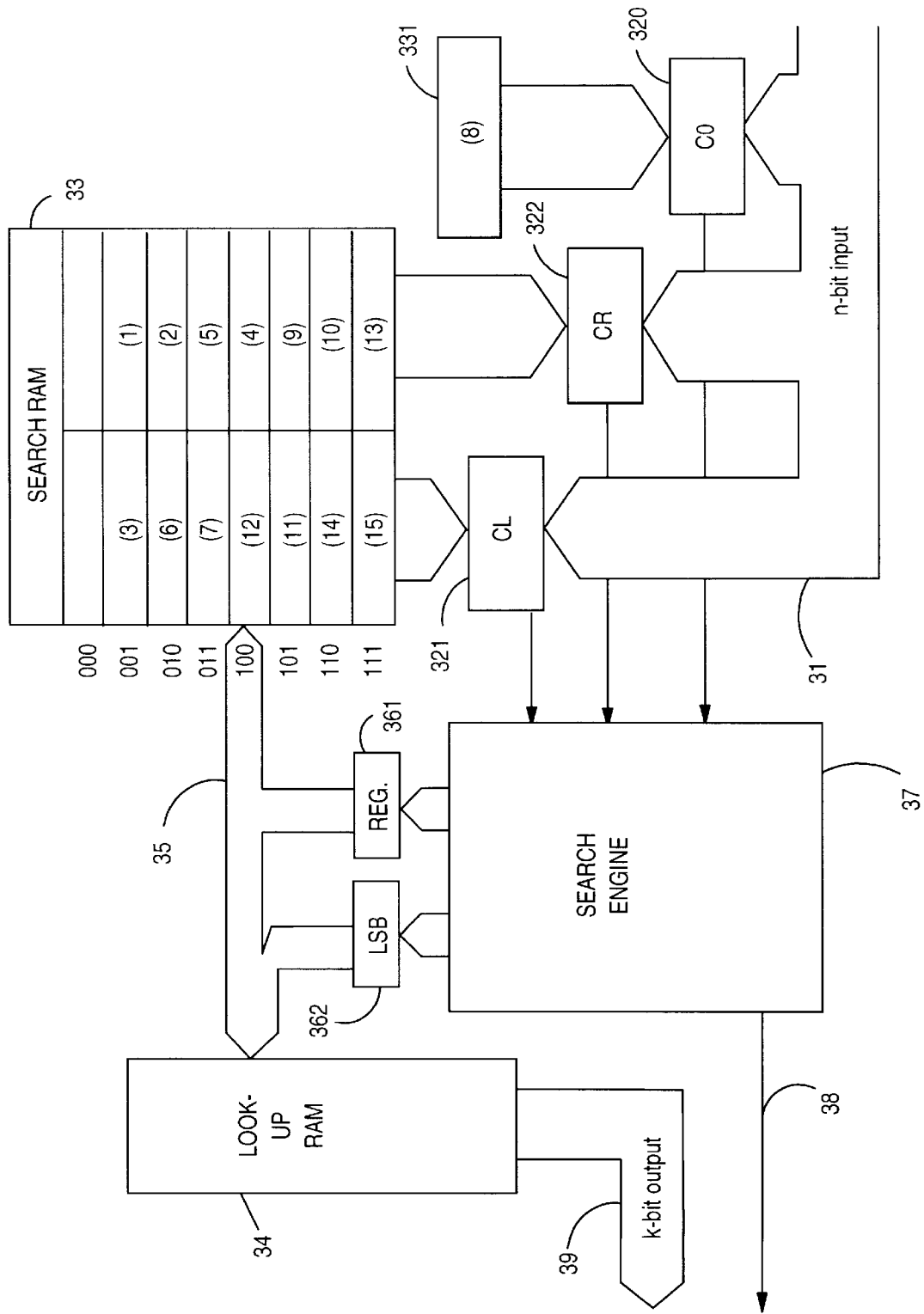
FIG. 3 shows the block diagram of an embodiment of the invention using a pipelining and look-ahead mechanism.

Referring still to FIG. 3, the SEARCH RAM 33 contains two rows of entries. The output of the rows (CR, CL) are connected to two comparators 321, 322. All three comparators 320, 321, 322 receive the input n-bit word from an n bit wide data bus 31. Other components are similar to those already described in the previous example. Also the notation of values is kept in line with the previous example, whenever appropriate. The cycles for the SEARCH ENGINE 37, however, are now modified. The results are derived by letting the input data (iv) be equal to the SEARCH RAM entry (3).

CYCLE 0 the RAM is addressed at ADDR_REG=B'100' and the input word is compared to the entry in the center of the sorted table; this entry is stored in a separate register shown on the right. If the input word is more than this entry, then a flag $F_0$ is set to one, otherwise it is set to zero.
   (Result: $F_0=0$)

CYCLE 1 the RAM is addressed at ADDR_REG=B'$F_0$,10'
   At the same time, the two RAM entries that were read at address B'100' (in the previous cycle) are compared to the input word. The flag $F_1$ is derived by
   $F_1 = (F_0 \text{ AND } (iv>CL)) \text{ OR } (\text{not}(F_0) \text{ AND } (iv>CR))$
   (Result: $F_1=(0 \text{ AND } 0) \text{ OR } (1 \text{ AND } 0)=0$)

CYCLE 2 the SEARCH RAM is addressed at ADDR_REG=B'$F_0$, $F_1$, 1' At the same time, the two SEARCH RAM entries that were read in the previous cycle are compared to the input word and a new flag, $F_2$ is derived. (Result: The address B'001' already leads to the matching entry (3). In a more general case, the procedure continues until the table is exhausted.)

If a match is found, a jump to the exit step is initiated and the signal line 38 is set to one exit The final address to the LOOKUP RAM 34, LUR_ADDR, is equal to the address pointing to the matching entry appended with a B'1' if the input word matched CL or a B'1' if the input word matched CR.

An extension of this example to search tables of larger size can easily be derived.

Figure 4:
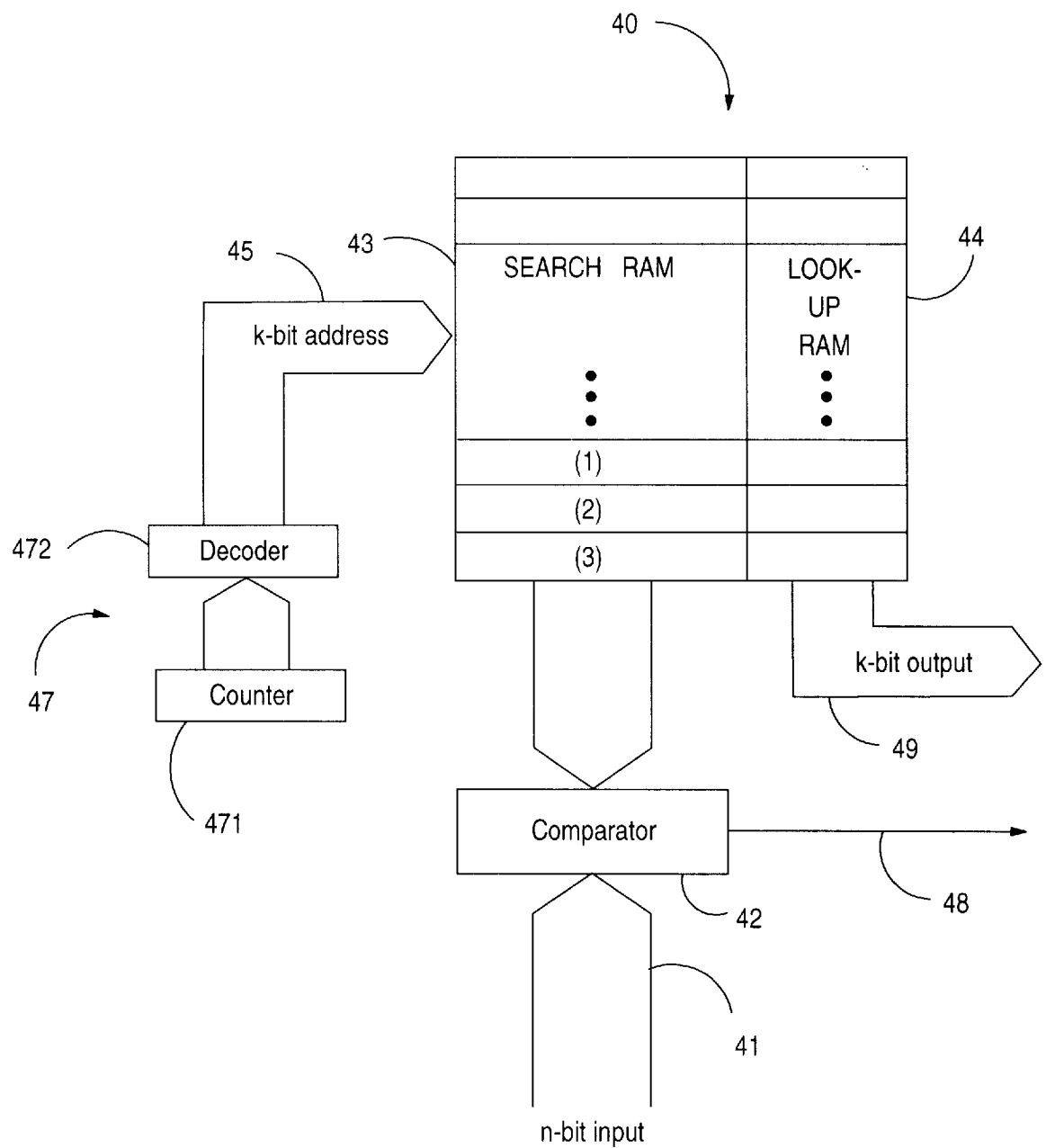
FIG. 4 is a block diagram showing basic components of the invention suitable for a small number of possible translations.

Search tables of smaller size may, however, be implemented according to another embodiment of the invention, which is illustrated by FIG. 4. In this embodiment, the n-bit entries to the SEARCH RAM 43 can be stored in an arbitrary manner. The respective k-bit translations are stored at the same addresses in the the LOOKUP RAM 44. Both, the SEARCH RAM and the LOOKUP RAM, are part of an n+k bit wide RAM 40. The SEARCH ENGINE 47 essentially consists of a counter 471 connected to a decoder 472. The counter is used to cycle through the values of 0 to $2^k-1$. i.e. through all entries. The proper addresses to the combined SEARCH and LOOKUP RAM 40 are provided by the decoder 472. When the signal line 48 of a comparator 42 indicates a match between the input word on the data bus 41 and the output of the SEARCH RAM 43, the output of the LOOKUP RAM represents the corresponding k-bit translation of the input word.

We claim:

1. An apparatus for translating a plurality of n-bit sequences into corresponding k-bit sequences with k<n, comprising:

first storage for storing said n-bit sequences in a predetermined order at first addresses which are determined by a binary search key;

second storage for storing said k-bit sequences in a predetermined order at second addresses being directly derivable from said first addresses;

address register for addressing said first storage and second storage;

comparator for comparing an output of said first storage with an n-bit input sequence;

and a search engine that performs a binary search by incrementing or decrementing said address register in accordance with a result of the comparison at the output of said comparator.

2. The apparatus of claim 1, wherein the first and/or the second storage are random access memories.

3. The apparatus of claim 1, wherein the first and second storage are part of a single memory unit.

4. The apparatus of claim 1, wherein the first storage and the comparator are divided to enable parallel comparisons of several n-bit sequences stored in said first storage with the input n-bit sequence.

5. The apparatus of claim 4 wherein the address register comprises a first part for addressing the first and second storage and a second part for addressing only said second storage.

6. The apparatus of claim 1, further comprising pipelining means for accessing the first storage and using the comparator in a same clock cycle.

7. The apparatus of claim 6, wherein the pipelining means comprises register for storing at least one n-bit sequence, and comparator connected to said register for comparing said one n-bit sequence with the input n-bit sequence.

8. The apparatus of claim 1 further comprising insertion means for storing a new entry in the first storage and the second storage by copying all entries up to a target address used for the new entry successively to a neighboring address and replacing the entry at said target address by the new one, and deletion means for erasing an old entry of said storage by successively overwriting said old entry by a copy of a neighboring entry until reaching a last entry in said storage.

9. Data switch, especially for asynchronous transfer mode (ATM) transmission, comprising an apparatus in accordance with any of the preceding claims.

10. A method for translating n-bit sequences into k-bit sequences with k<n, comprising steps of:

storing said plurality of n-bit sequences in a predetermined order in a first storage at first addresses which are determined by a binary search key;

storing the corresponding k-bit sequences in a predetermined order in second storage at second addresses being directly derivable from said first address;

performing a binary search in said first storage to find a match to an n-bit input sequence, said binary search comprising the step of incrementing or decrementing an address register in accordance with the result of a comparison between said n-bit input sequence and an output of said first storage and applying the address of said match for addressing said second storage to output a k-bit translation sequence corresponding to said input n-bit sequence.

11. The method of claim 10, wherein during the search a number i of n-bit sequences stored in the first storage is addressed and compared in parallel with the input n-bit sequence, a binary number is related to each value of i, and said binary number is combined with the address of the match for addressing the second storage.

12. The method of claim 11, wherein the step of addressing a new n-bit sequence and the step of comparing a previously addressed n-bit sequence with the input sequence are being performed in a same clock cycle.

13. The method of claim 10 wherein a new entry in the first storage and the second storage is inserted by copying all entries up to a target address used for the new entry successively to a neighboring address and replacing the entry at said target address by the new one, and an old entry of said storage is erased by successively overwriting said old entry by a copy of a neighboring entry until a last entry in said storage is reached.

14. In an Asynchronous Transfer Mode ATM switching system, a device for rapidly looking up and translating ATM header VPI/VCI associated with ATM cells into corresponding k-bit sequence comprising:

a first storage device operatively disposed in the ATM switching system for storing at least selected ones of n-bit sequences, representing the VPI/VCI, at locations addressable by a binary search key;

a comparator operatively coupled to the first storage device, said comparator comparing an output from said first storage device with an n-bit input sequencer; and an address generator responsive to a result of the comparator for performing a binary search to generate the binary address for accessing said first storage.

15. The device of claim 14 further including a second storage device for storing each corresponding k-bit sequence at a binary address identical to the one at which each of the n-bit sequences is stored; and a selector using the address of the first storage device whereat a match occurs between the input sequence and the output from said first storage device to access the second storage device.

16. An ATM switch comprising an apparatus for translating a plurality of n-bit sequences into corresponding k-bit sequences with k<n, comprising:

first storage that stores said n-bit sequences in a predetermined order at first addresses which are determined by a binary search key;

second storage that stores said k-bit sequences in a predetermined order at second addresses being directly derivable from said first addresses;

address register that addresses said first storage and second storage;

comparator that compares an output of said first storage with an n-bit input sequence;

and means for performing a binary search by incrementing or decrementing said address register in accordance with a result of the comparison at the output of said comparator.

* * * * *